United States Patent
LeDuc

(10) Patent No.: US 6,551,435 B1
(45) Date of Patent: Apr. 22, 2003

(54) PROCESSES OF FORMING AN INSULATED FOAM BOARD SYSTEM

(75) Inventor: Edward Charles LeDuc, Marietta, GA (US)

(73) Assignee: Pactiv Corporation, Lake Forest, IL (US)

( * ) Notice: Subject to any disclaimer, the term of this patent is extended or adjusted under 35 U.S.C. 154(b) by 289 days.

(21) Appl. No.: 09/591,975

(22) Filed: Jun. 12, 2000

Related U.S. Application Data

(62) Division of application No. 09/136,101, filed on Aug. 18, 1998.

(51) Int. Cl.[7] .................. B32B 31/00; B32B 31/18; B32B 3/26; B29C 47/04; B24D 9/00
(52) U.S. Cl. ............ 156/250; 156/244.11; 156/244.18; 156/244.19; 428/316.6; 428/319.3; 264/45.5; 264/DIG. 10; 525/241
(58) Field of Search ............. 428/316.6, 317.1, 428/317.7, 319.3, 319.7; 525/241; 156/244.11, 250, 244.18, 244.19, 244.24, 244.27, 79; 264/45.5, 45.6, DIG. 10

(56) References Cited

U.S. PATENT DOCUMENTS

| | | | | |
|---|---|---|---|---|
| 4,062,712 A | * | 12/1977 | Stark | 156/244 |
| 4,415,392 A | | 11/1983 | Komori | 156/244.13 |
| 5,591,496 A | * | 1/1997 | Anderson et al. | 428/36.5 |
| 5,695,870 A | | 12/1997 | Kelch et al. | 428/318.4 |
| 5,882,776 A | * | 3/1999 | Bambara et al. | 428/215 |

* cited by examiner

Primary Examiner—J. A. Lorengo
(74) Attorney, Agent, or Firm—Jenkens & Gilchrist

(57) ABSTRACT

An insulated foam board system of the present invention comprises a first layer, a second layer and a central layer. The first layer is made from a material selected from the group consisting of alkenyl aromatic polymers, polypropylenes, polyethylene terephthalates, polyethylenes and combinations thereof. The second layer is made from a material selected from the group consisting of alkenyl aromatic polymers, polypropylenes, polyethylene terephthalates, polyethylenes and combinations thereof. The central layer is located between the first layer and the second layer. The second layer is bonded to the first layer and the third layer. The central layer is made from a material selected from the group consisting of crystal polystyrene, impact polystyrene, polyethylene terephthalate and combinations thereof.

42 Claims, 2 Drawing Sheets

PROCESSES OF FORMING AN INSULATED FOAM BOARD SYSTEM

This application is a divisional of U.S. patent application Ser. No. 09/136,101, filed Aug. 18, 1998.

FIELD OF THE INVENTION

The present invention is directed to an insulating foam board system and methods of producing the same. In particular, the present invention is directed to a foam board system and methods thereto that combine at least three layers to provide greater durability and structural integrity to the foam board system.

BACKGROUND OF THE INVENTION

Insulating material is used in the construction of buildings. Insulating materials are especially called for in regions of the country that experience extreme weather conditions. Popular modem-day insulating materials include foam boards which are often manufactured from a polystyrene polymer having a laminated coating. The foamed polystyrene board has insulating properties associated therewith. The laminated coating functions primarily to protect the foamed polystyrene polymer and provide the foam board with enhanced protection, durability, strength and resiliency.

Such foam board insulation can be found in a number of different forms. For example, foam board insulation is sold in individual flat sheets that may be applied to the exterior of a building in combination with an exterior face material such as brick or siding. Foam board insulation in this application is used as one layer in the overall exterior wall construction of a building.

Foam board insulation may also be in the form of a folded or hinged board (also referred to as fanfold board) that when unfolded at the hinges can be applied to the exterior of a building in the same manner as flat foam board insulation. The fanfold or flat board insulation can be constructed of a foamed polystyrene with a laminated coating that provides protection, durability, strength and resiliency. The fanfold board is often preferred over the flat foam board insulation because of easier handling and installation.

Notwithstanding the laminated coating in the above-described types of foam board insulation, the foam board insulation is still susceptible to deterioration at the building site prior to installation. This problem is further evident when, for example, delays occur in the installation and/or the installation occurs in extreme weather conditions. Additionally, the foam board insulation is often mishandled or improperly installed such that the laminated coating does not provide sufficient protection and strength, resulting in damaged foam board insulation. One common example of damage is when a piece breaks off from a remainder of the foam insulation board.

Accordingly, a need exists for both types of foam board insulation—flat foam board insulation and folded/hinged foam board insulation—which have increased weather resistance, protection, durability and strength.

SUMMARY OF THE INVENTION

In one embodiment, an insulated foam board system of the present invention comprises a first layer, a second layer and a central layer. The first layer is made from a material selected from the group consisting of alkenyl aromatic polymers, polypropylenes, polyethylene terephthalates, polyethylenes and combinations thereof. The second layer is made from a material selected from the group consisting of alkenyl aromatic polymers, polypropylenes, polyethylene terephthalates, polyethylenes and combinations thereof. The central layer is located between the first layer and the second layer. The central layer is bonded to the first layer and the second layer. The central layer is made from a material selected from the group consisting of crystal polystyrene, impact polystyrene, polyethylene terephthalate and combinations thereof.

In another embodiment, the insulated foam board system comprises a first layer, a second layer, a central layer and at least one laminated surface coating.

BRIEF DESCRIPTION OF THE DRAWINGS

Other objects and advantages of the invention will become apparent upon reading the following detailed description and upon reference to the drawings.

Figure 1:
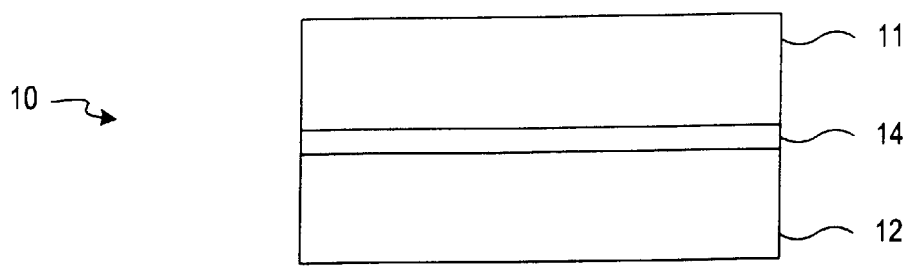
FIG. 1 is a side view of the foam board insulation system of the present invention.

While the invention is susceptible to various modifications and alternative forms, a specific embodiment thereof has been shown by way of example in the drawing and will herein be described in detail. It should be understood, however, that it is not intended to limit the invention to the particular forms disclosed but, on the contrary, the intention is to cover all modifications, equivalents, and alternatives falling within the spirit and scope of the invention as defined by the appended claims.

DESCRIPTION OF ILLUSTRATIVE EMBODIMENTS

Foam Board Insulation System

Figure 2:
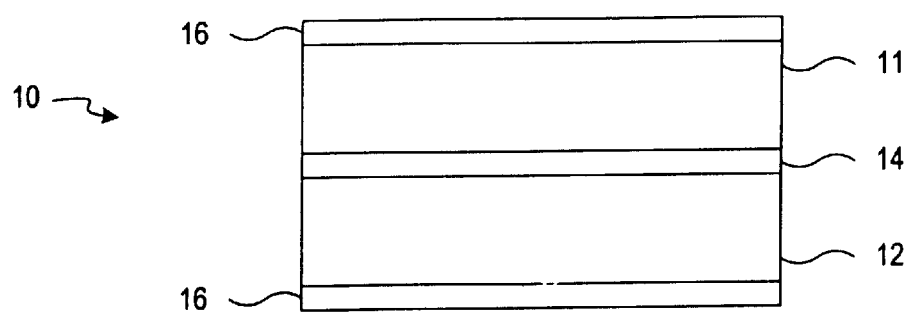
FIG. 2 is a side view of the foam board insulation system according to a second embodiment of the present invention.
Figure 3:
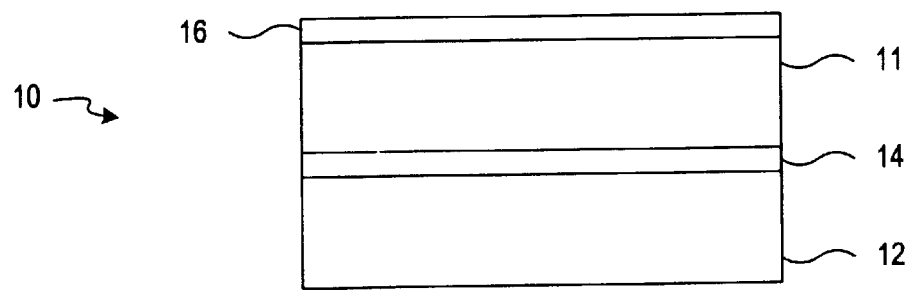
FIG. 3 is a side view of the foam board insulation system according to a third embodiment of the present invention.

The foam board insulation system 10 of the present invention, as shown in FIG. 1, includes a first layer 11 and a second layer 12. The foam board insulation system 10 of FIG. 1 also includes a central layer 14 which is located between the first and second layers 11, 12. The central layer 14 bonds the first and second layers 11, 12. As shown in FIGS. 2 and 3, the foam board insulation system 10 may contain optional layers, such as laminated surface coatings or "facers" 16. The laminated surface coating 16 may be added to an outer surface of the first and/or second layers 11, 12. The foam board insulation system of the present invention has increased durability and strength.

First and Second Layers

The first layer 11 and the second layer 12 may be independently formed from any of the following resins: alkenyl aromatic polymers, polypropylenes, polyethylene terephthalate, polyethylenes and combinations thereof. It is contemplated that the first and second layers 11, 12 may be formed from any foamable material that provides insulating properties. It is not necessary that the first layer 11 and the second layer 12 be formed from the same resins. For example, the first layer 11 and the second layer 12 may be formed from separate extruders.

The term "alkenyl aromatic polymer," as used herein, includes polymers of aromatic hydrocarbon molecules that contain an aryl group joined to a olefinic group with only double bonds in the linear structure, such as styrene, α-methylstyrene, o-methylstyrene, m-methylstyrene, p-methylstyrene, α-ethylstyrene, α-vinylxylene, α-chlorostyrene, α-bromostyrene, vinyl toluene and the like. Alkenyl aromatic polymers also include homopolymers of styrene (commonly referred to as polystyrene) and also copolymers of styrene and butadiene (commonly referred to as impact polystyrene).

The term "polystyrenic resin" or "polystyrenic material" as used herein includes homopolymers of styrene, and styrene copolymers comprised of at least 50 mole percent of a styrene unit (preferably at least about 70 mole percent) and a minor (i.e., less than 50%) proportion of a monomer copolymerizable with styrene. The term "polystyrenic resin" or "polystyrenic material" as used herein also includes blends of at least 50 percent by weight of the styrene homopolymer (preferably at least about 60 weight percent) with another predominately styrenic copolymer. The physical blends are combined in a dry form after the blends have previously been polymerized.

The polystyrenic resin that can be used in the present invention can be any of those homopolymers obtained by polymerizing styrene to a weight average molecular weight ($M_w$) of from about 100,000 to about 450,000 (commonly referred to as crystal polystyrene), or can be any of those graft copolymers obtained by polymerizing a blend of polymerized styrene upon a nucleus of styrene-butadiene rubber (SBR) to a weight average molecular weight of from about 100,000 to about 350,000 (commonly referred to as impact polystyrene).

Impact polystyrenes are generally classified as medium impact polystyrene (MIPS), high impact polystyrene (HIPS) or super high impact polystyrene (S-HIPS). The butadiene level of the impact polystyrene is preferably in the range from about 3 to about 10 weight percent of the copolymer (butadiene and polystyrene). The impact polystyrene generally has a melt flow index of less than about 5 g/10 min., and preferably less than about 3 g/10 min. A blend of crystal polystyrene and impact polystyrene is preferably used in forming the first and second layers 11, 12.

The alkenyl aromatic polymer of the present invention can be obtained by blending two or more alkenyl aromatic polymers. For example, blends of crystal polystyrene and impact polystyrenes, such as crystal polystyrene and HIPS, may be blended to comprise the alkenyl aromatic polymer of the present invention.

The term "polypropylene" as used herein includes polymers of propylene or polymerizing propylene with other aliphatic polyolefins, such as ethylene, 1-butene, 1-pentene, 3-methyl-1-butene, 4-methyl-1-pentene, 4-methyl-1-hexene, 5-methyl-1-hexene and mixtures thereof. Polypropylene not only includes homopolymers of propylene, but also propylene copolymers comprised of at least 50 mole percent (preferably at least 70 mole percent) of a propylene unit and a minor proportion of a monomer copolymerizable with propylene and blends of at least 50 percent by weight of the propylene homopolymer with another polymer.

The term "polyethylene" as used herein includes low density polyethylene (LDPE), medium density polyethylene (MDPE), high density polyethylene (HDPE), very low density polyethylene (VLDPE), linear low density polyethylene (LLDPE), metallocene-catalyzed linear low density polyethylene (mLLDPE) and combinations thereof.

LDPE is generally defined as an ethylenic polymer having a specific gravity of from about 910 to about 925 kg/m³. MDPE is generally defined as an ethylenic polymer having a specific gravity between the LDPEs and the HDPEs (i.e., from about 925 to about 940 kg/m³). The term polyethylene as used herein includes homopolymers of ethylene and copolymers comprised of at least 50 mole percent of a ethylene unit (preferably at least 70 mole percent) and a minor (i.e., less than 50%) proportion of a monomer copolymerizable with the ethylene unit. The term LDPE as used herein also includes physical blends of two or more different homopolymers that are classified as LDPEs. Similarly, the term MDPE and HDPE may also include blends of two or more different homopolymers classified as MDPEs and HDPEs, respectively.

The high density polyethylene (HDPE) of the present invention has a specific gravity of from about 940 to about 970 kg m³. The M, preferably is greater than about 1,000, 000 and preferably greater than about 1,200,000. The z-average molecular weight ($M_z$) is characterized by a concentration of extremely high molecular weight polymer chains (i.e., those near an upper end of the molecular weight distribution). The HDPE generally has a polydispersity index, $D=M_w/M_n$, in the range of from about 12 to about 20.

The VLDPE resins have densities ranging from about 880 to about 912 kg/M³, more commonly from about 890 to about 910 kg/m³, and melt indices of from about 0.5 to about 5 g/10 min., preferably from about 1 to about 3 g/10 min.

The LLDPE of the present invention are preferably those having from about 1 to about 20, preferably from about 1 to about 10 weight percent of said higher alpha olefin monomer copolymerized therein. In addition, the alpha olefin monomer employed in the ethylenic copolymer may be selected from the group consisting of 1-butene, 3-methyl-1-butene, 3-methyl-1-pentene, 1-hexene, 4-methyl-1-pentene, 3-methyl-1-hexene, 1-octene and 1-decene. The LLDPE resins that can be used in the present invention have densities ranging from about 890 to about 940 kg/m³, more commonly from about 900 to about 930 kg/m³, and a melt index ($I_2$) of from about 1 to about 10 g/10 min. as determined by ASTM D1238.

The metallocene-catalyzed polyethylene (mLLDPE) is a polymer having a low polydispersity. The low polydispersity polymer may be prepared from a partially crystalline polyethylene resin that is a polymer prepared with ethylene and at least one alpha olefin monomer, e.g., a copolymer or terpolymer. The alpha olefin monomer generally has from about 3 to about 12 carbon atoms, preferably from about 4 to about 10 carbon atoms, and more preferably from about 6 to about 8 carbon atoms. The alpha olefin comonomer content is generally below about 30 weight percent, preferably below about 20 weight percent, and more preferably from about 1 to about 15 weight percent. Exemplary comonomers include propylene, 1-butene, 1-pentene, 1-hexene, 3-methyl-1-pentene, 4-methyl-1-pentene, 1-octene, 1-decene, and 1-dodecene.

The low polydispersity polymer has a density of from about 880 to about 940 kg/m³. The polydispersity polymer should have a molecular weight distribution, or polydispersity, ($M_w/M_n$, "MWD") within the range of from about 1 to about 4, preferably from about 1.5 to about 4, more preferably from about 2 to about 4, and even more preferably from about 2 to about 3. The melt flow ratio (MFR) of these polymers, defined as $I_{20}/I_2$ and as determined in accordance to ASTM D1238, is generally from about 12 to about 22 and preferably from about 14 to about 20. The melt index (MI), defined as the $I_2$ value, should be in the range of from about 0.5 to about 10 g/10 min. and preferably from about 1 to about 5 g/10 min. as determined by ASTM D1238.

The first and second layers 11, 12 are preferably formed from alkenyl aromatic polymers and, specifically, from polystyrenic resins. A blend of crystal polystyrene and impact polystyrene is preferably used in forming the first and second layers 11, 12. It is contemplated that two or more first layers 11 may be independently made from the resins discussed above in forming the foam board insulation system. Similarly, two or more second layers 12 may be independently made from the resins discussed above in forming the foam board insulation system.

It is contemplated that the first and second layers may be at least partially made from reclaimed or reprocessed material. The term "reclaimed material" is used herein as being scrap material that previously existed and has been reprocessed for incorporation (i.e., as compounded pellets) as a material into the invention. The term "scrap" or "scrap material" is used herein as being material that is not suitable for use due to a variety of reasons which include physical damage and aesthetic appearances. Polystyrenic resins are generally preferred because they provide more stiffness than other materials such as polyethylene as measured by ASTM D1037-87 and ASTM D1621-73 in the insulated foam board system. Also, at the present time, polystyrenic resins are more economical to use than the other contemplated resins in forming the first and second layers 11, 12.

Central Layer

As discussed above, the central layer 14 bonds the first layer 11 and the second layer 12. The central layer 14 may be formed from the following resins: crystal polystyrene, impact polystyrene (IPS) including high impact polystyrene (HIPS), polyethylene terephthalate and combinations thereof. The central layer 14 is preferably formed from HIPS. It is contemplated that two or more central layers 14 may be independently made from the resins discussed above in forming the foam board insulation system. The central layer 14 may be made of reclaimed or reprocessed material.

The central layer 14 also is more resistant to breaking than the first and second layers 11, 12 because of the flexibility of the central layer 14. Thus, a break or tear, for example, in the first layer 11 is less likely to propagate to the second layer 12 with the addition of the central layer 14 to the foam board insulation system 10.

This bonding of the first and second layers 11, 12 with the central layer 14 may be referred to as attaching, adhering, fusing or the like. For example, the central layer 14 may be chemically bonded or thermally bonded to the first and second layers 11, 12. Whether the central layer 14 is chemically or thermally bonded is dependent on the selected resin(s) of the central layer 14 as compared to the first and second layers 11, 12. Thermal bonding may be accomplished by any conventional manner to fuse the polymeric surfaces including the use of a flameless air torch, heated rolls and infrared heating.

Chemical bonding can be accomplished through an additional adhesive layer or layers (not shown) between, for example, the central layer 14 and the first layer 11. Similarly, an adhesive layer may be located between the central layer 14 and the second layer 12. One type of adhesive that may be used is ethylene vinyl acetate (EVA). For example, modified EVA such as BYNEL® made by DuPONT® may be used. These modified EVAs have melt indices from about 6.4 to about 25 g/10 min. as measured by ASTM D1238 and densities from about 0.923 to about 0.947 g/cm$^3$ as measured by ASTM D1505. BYNEL® is an adhesive that is designed to bond materials that would not ordinarily adhere to each other. Another type of adhesives that maybe used is a block copolymer which comprise polymeric regions of styrene-rubber-styrene. For example, KRATON® made by Shell® Chemical Company may be used. Other adhesives are contemplated in the present invention to bond the central layer 14 to either the first layer 11 or the second layer 12.

Laminated Surface Coating(s)

To provide a more durable and strengthened foam board insulation system, the first layer 11 and the second layer 12 may also include optional laminated surface coating(s) 16. As shown in FIG. 2, both of the outer surfaces of the first layer 11 and the second layer 12 include a laminated surface coating 16. It is contemplated that only one of the layers may have a laminated surface coating 16 (see, e.g., FIG. 3).

The laminated surface coatings 16 may be made from different resins that are independently selected from the material consisting of impact polystyrene (IPS), which includes high impact polystyrene (HIPS), polypropylene, crystal polystyrene, polyethylenes, metallized film and combinations thereof. One example of a metallized film is a polyolefin metallized with aluminum. The polyolefin of the metallized film may be a combination of polyolefins such as polypropylene and polyethylene. The laminated surface coating(s) 16 are preferably made from HIPS.

The foam board insulation system of the present invention preferably comprises a first layer 11, a second layer 12, a central layer 14 and at least one laminated surface coating 16. The foam board insulation system most preferably comprises a first layer 11, a second layer 12, a central layer 14 and two or more laminated surface coatings 16.

Properties of the Foam Board Insulation System

The foam board insulation system of the present invention generally has a density as measured by ASTM D1622-88 from about 1 to about 6 lbs/ft$^3$ and preferably is from about 2 to about 4 lbs/ft$^3$.

The foam board insulation system enhances the stiffness, strength and durability without the need to make the foam board thicker in obtaining such enhanced properties. The foam board insulation system of the present invention exhibits good stiffness and strength in the machine direction as measured by ASTM D1037-87. The foam board insulation system generally has a machine direction (MD) average flexural strength stress at yield as determined by ASTM D1037-87 of greater than about 150 psi. It is recognized that some properties, such as MD average flexural strength at yield, of the foam board insulation system are decreased by perforating the foam board insulation system for applications in which a vapor barrier is not desired (i.e. for those applications have a WVTR as measured by ASTM E96-95 being greater than about 1.0). The amount of decrease of various properties depends on factors such as the number, length and depth of the perforations. It is also recognized that some properties, such as MD average flexural strength stress at yield, will increase as the thickness increases in the foam board insulation system.

The MD average flexural strength stress at yield is preferably greater than about 180 psi, most preferably is greater than about 225 psi and even more preferably greater than 275 psi. The foam board insulation system generally has a transverse direction (TD) average flexural strength stress at yield as determined by ASTM D1037-87 of greater than about 120 psi. The TD average flexural strength stress at yield is preferably greater than about 150 psi and most preferably greater than about 200 psi.

The foam board insulation system generally has an MD average load at yield as determined by ASTM D1037-87 greater than about 2.0 lbs. The MD average load at yield is preferably greater than about 3.0 lbs and most preferably is greater than about 4.0 lbs. The foam board insulation system generally has a TD average load at yield as determined by ASTM D1037-87 greater than about 1.3 lbs. The TD average load at yield is preferably greater than about 2.5 lbs. and most preferably greater than about 4.0 lbs.

The foam board insulation system generally has a MD average compressive strength at 10% as determined by ASTM D 1621-73 greater than about 6 psi. The MD average compressive strength at 10% is preferably greater than about 8 psi and most preferably is greater than about 10 psi.

The foam board insulation system generally has a MD strain at yield as determined by ASTM D1037-87 greater than about 0.025 in/in and preferably greater than about 0.30 in/in. The foam board insulation system generally has a TD strain at yield as determined by ASTM D1037-87 greater than about 0.025 in/in and preferably greater than about 0.030 in/in. The foam board insulation system generally has a MD toughness as determined by ASTM D1037-87 greater than about 1.0 in-lb/in$^3$ and preferably greater than about 1.5 in-lb/in$^3$. The foam board insulation system generally has a TD toughness as determined by ASTM C203-92 greater than about 0.75 in-lb/in$^3$ and preferably greater than about 1.25 in-lb/in$^3$.

The foam board insulation system of the present application may be formed into a number of shapes. For example, the foam board insulation system may be a flat board sheet or a folded or hinged board (typically referred to as a fanfold board). The fanfold board is designed to unfold at its hinges and include a number of individual panels.

The foam board insulation system of the present invention may be manufactured in a variety of sizes. Popular sizes used in the housing market include a 2 foot by 8 foot (2'×8') or a 4 foot by 8 foot flat board sheet (4'×8'). One popular size is 4 foot by 50 foot fanfold board (4'×50') which includes a number of individual panels. The foam board insulation system may also vary in thickness. Generally, the thickness of the foam board insulation system is from about ⅛ of an inch to about 1 inch as measured by ASTM D1622-88. The thickness of the foam board insulation system is typically from about ⅛ to about ½ of an inch. Popular thicknesses for the foam board insulation system of the present invention include ¼", ⅜" and ½."

The layers of the insulated foam board system may also vary in their respective weight percent relative to each other. The insulated foam board system generally comprises from about 2 wt. % to about 50 wt. % of the central layer 14. The remainder of the insulated foam board system (50 wt % to about 98 wt. %) comprises the first layer 11, second layer 12 and the optional laminated surface coating(s) 16. It is contemplated that the remainder of the insulated foam board system can include other materials including, but not limited to, adhesives. Preferably, the insulated foam board system comprises from about 5 to about 25 wt. % of the central layer 14 and most preferably from about 5 wt. % to about 15 wt. % of the central layer 14. The remainder of the insulated foam board system (from about 75 wt. % to about 95 wt. % in the preferred embodiment and from about 85 wt. % to about 95 wt. % in the most preferred embodiment) comprises the first layer 11, second layer 12 and the optional laminated surface coating(s) 16. In general, the central layer 14 is preferably decreased on a percentage basis when the thickness of the foam board insulation system is increased because of economic considerations.

The foam board insulation system of the present invention can be used in a variety of applications. For example, the foam board insulation system may be applied to the exterior of a building in combination with an exterior face material such as brick or siding. This type of application is referred to in the industry as siding underlayment. The foam board insulation system may also be used as underlayment for walls and for commercial roofing systems.

Process of the Present Invention

The process of the present invention includes the step of providing a polymeric web of foam. In one embodiment, the process uses a tandem foam extrusion line. For example, the process begins by loading pellets of a polymeric resin(s) such as alkenyl aromatic polymers, polypropylenes, polyethylene terephthalate, polyethylenes and combinations thereof into their solid form into an extrusion hopper. The pellets of the polymeric resin(s) are to be used in forming the first layer and the second layer. According to another embodiment, the second layer may be formed with pellets of different polymeric resin(s) than the ones in forming the first layer (i.e., the first layer and the second layer would have to be formed from separate extruders).

A nucleating agent (also referred to as cell size control agent) or combination of such nucleating agents may be employed in the process of the present invention for advantages such as their capability for regulating cell formation and morphology. The amount of nucleating agent to be added depends upon the desired cell size, the selected blowing agent and the density of the polymeric composition. Known nucleating agents such as talc, mixtures of sodium bicarbonate and citric acid, and the like may be employed in the present invention.

It is contemplated that stability control agent(s) may also be added to the polymeric resin(s), including conventional stability control agents. Some examples of stability control agents that may be used include, but are not limited to, glycerol monostearate, saturated higher fatty acid amides and glycerol monoester of a $C_{20}$–$C_{24}$ fatty acid.

If desired, fillers, colorants, light and heat stabilizers, plasticizers, chemical blowing agents, flame retardants, foaming additives and plastic compounding agents can be added to the polymeric composition. The polymeric composition comprises the polymeric resin and, if added, the nucleating agent, the stability control agent and additives. The polymeric composition is conveyed through a feed zone of the extruder and heated at a temperature sufficient to form a polymeric melt.

A physical blowing agent is added at the injection port area of the extruder in an appropriate ratio to the target density. The selected blowing agent may be any type that is capable of producing foam with the selected resin. Some examples of blowing agents include physical blowing agents such as halocarbons, hydrocarbons or combinations thereof. Examples of these include commercially available hydrofluorocarbons, such as HFC-152a and HFC-134a, and the $C_3$–$C_6$ hydrocarbons. Other types of blowing agents include carbon dioxide. The polymeric composition and the selected blowing agent are thoroughly mixed within the extruder in a mixing zone and subsequently cooled in a cooling zone. The cooled polymeric-blowing agent melt is extruded thorough a die.

Figure 4:
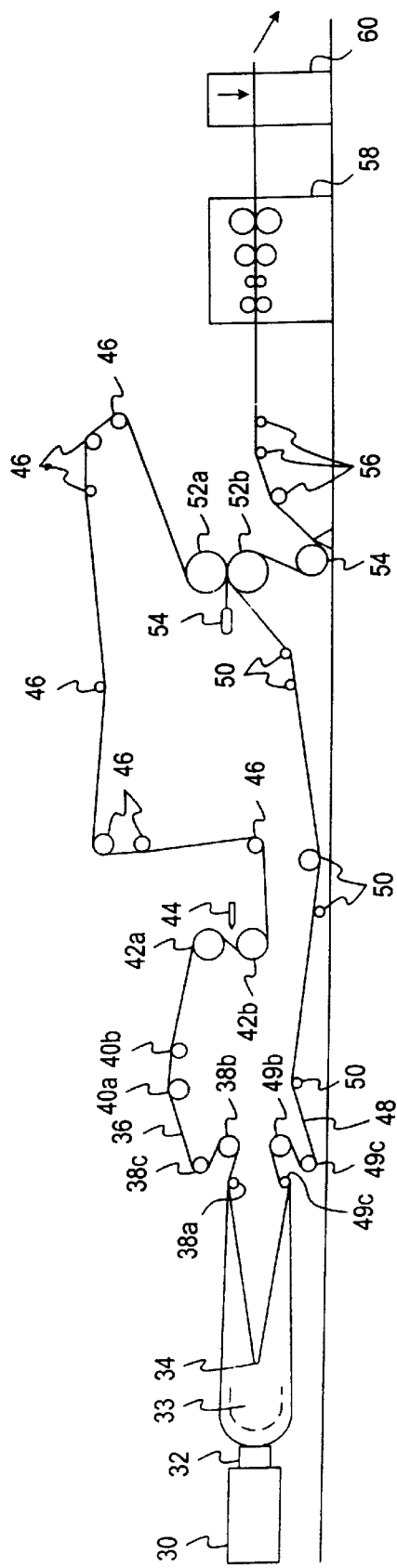
FIG. 4 is a schematic flow diagram of an overall sequence of operations according to one embodiment involved in the manufacture of the foam board insulation system.

According to one embodiment of the present invention, the polymeric foam in FIG. 4 is extruded from an extruder 30 through a round die 32. After exiting the round die 32, the extrudate expands when entering a lower pressure region (e.g., the atmosphere) and forms a polymeric web of foam. The polymeric web of foam is stretched over a sizing drum 33 to size the web of foam and then is split into two separate polymeric webs of foam at splitter 34. Splitters are well known in the art and, thus, any conventional splitter that can divide a web of foam into two separate webs of foam may be selected.

The outer surfaces of the top web 36 and bottom web 48 are typically cooled so as to form a "skin." The skin is typically about a few thousands (or a few mils) thick, but may vary depending on the cooling employed. The skin provides additional strength and also provides a smoother surface which is more aesthetically pleasing to a consumer. It is contemplated that the methods of cooling can include water cooling and air cooling methods. The skinning may be performed, for example, by stretching the top web 36 over a sizing drum 33 with optional cooling wherein an inner surface of the top web 36 is cooled. The sizing drum 33 with optional cooling may be incorporated in proximity to the splitter 34. It is contemplated that one or more of the surfaces of each of the polymeric webs of foam may be cooled.

A top polymeric foam web 36 proceeds to travel around a S-wrap of rollers 38a–c in which roller 38a is an idler roller and rollers 38b and 38c are driven or pull rollers. The top foam web 36 will form the first layer 11 of the insulated foam board system 10. The driven rollers 38b, 38c assist in moving the top foam web 36 through the process of the present invention. The top foam web 36 proceeds through two idler rollers 40a,b before proceeding between two driven rollers 42a,b. Driven rollers 42a,b assist in maintaining a consistent surface for which to add an optional laminated surface coating 16 via a coating or a laminating machine 44. The coating machine 44 may be any conventional machine that is capable of applying the laminated surface coating 16 to the top foam web 36. The coating machine 44 is optional to the process of the present invention. The top foam web 36, including the optional laminated surface coating 16, continue proceeding through a plurality of idler rollers 46. It is contemplated that the top foam web 36 may be processed to include printing on a surface(s) or other treatments.

Similarly, a bottom foam web 48 of FIG. 4 is proceeding at the same time through a S-wrap of rollers 49a–c that is identical to that described above with respect to the top foam web 36 and the S-wrap of rollers 38a–c. The bottom foam web 48 will eventually form the second layer 12 of the insulated foam board system. The bottom foam web 48 then proceeds around a plurality of rollers 50. If desired, a laminated coating machine (not shown) may be added to the process of the present invention that is similar to the coating machine 44 so as to provide a second laminated surface coating 16 to the bottom foam web. It is contemplated that the bottom foam web 48 may be processed to include printing on a surface(s) or other treatments.

The bottom foam web 48 and the top foam web 36 proceed through the opening between two driven nip or polish rollers 52a,b. At this opening, a central layer 14 is inserted between the bottom web 48 and the top web 36. The central layer 14 is inserted by a coating or a laminating machine 54. At this point, the optional laminated surface coating(s) 16, the top web 36, the central layer 14 and the bottom web 48 form an insulated foam board system.

The optional laminated surface coating(s) 16, the top foam web 36, the central layer 14 and the bottom foam web 48 proceed to a driven roller 54 and around a plurality of idler rollers 56. In an alternative embodiment, the roller 54 is an idler roller that, along with the plurality of idler rollers 56, may be located generally parallel to roller 52b such that the laminated surface coating(s) 16, top foam web 36, central layer 14 and the bottom foam web 48 proceed in a generally horizontal direction after exiting between the rollers 52a, 52b. As shown in FIG. 4, the laminated surface coating(s) 16, the top foam web 36, the central layer 14 and the bottom web 48 proceed through an optional perforating creasing machine 58. The perforating creasing equipment 58 may include any conventional equipment that is capable of folding the insulated foam board system of the present invention into a fanfold foam board. Of course, if a flat board sheet is desired, the creasing equipment 58 should not be included in the process. A perforating machine, however, may be used in producing a flat board sheet. The insulated foam board system is then cut to a desired dimension by shearing equipment 60. The shearing equipment 60 may be any equipment capable of cutting the insulated foam board system into desired dimensions. It is also contemplated that other finishing operations may occur such as packaging and trimming.

It is contemplated that various measurements may be taken throughout the process to ensure consistent measurements of the insulated foam board system.

According to a second process of the present invention (not shown), the two separate polymeric webs of foam are extruded from separate extruders. The first polymeric web of foam corresponds to the top foam web 36, while the second polymeric web of foam corresponds to the bottom foam web 48 of FIG. 4. In the second embodiment, two splitters 34 are necessary since the webs 36 and 48 are formed separately and, thus, are separately split. The remainder of the process described with respect to FIG. 4 is contemplated for use in the second embodiment.

The first process of the present invention eliminates producing individual webs of material from two separate extruders. It is contemplated, however, that the insulated foam board system may be made by two extruders as described in the second process.

EXAMPLES

The results of the tests appear in Table 1 where Table 1 includes two inventive products (Inventive Products 1 and 2) and three comparative products (Comparative Products 3–5).

Referring to Table 1, Inventive Product 1 was a three layer insulated foam board system. The first and second layers (layers A) of Inventive Product 1 comprised a general purpose crystal polystyrene. The central layer (layer B), located between the first and second layers, was a high impact polystyrene (HIPS). The HIPS of layer B comprised about 93 wt. % general purpose crystal polystyrene and about 7 wt. % of butadiene (rubber). The insulated foam board system comprised 83.5 wt. % of layers A and 16.5 wt. % of layer B. The total thickness of layers A was 0.228 inch, while the thickness of layer B was 0.0015 inch. Inventive Product 2 comprised the same three layered structure as Inventive Product 1, except that Inventive Product 2 included perforations thereto and had a total thicknesses of layers A being slightly thicker (0.243 inch).

Comparative Product 3 was a two layer insulated foam board system comprising a first layer and a second layer (layers A). Layers A each were comprised of a general purpose crystal polystyrene. The total thickness of layers A was 0.223 inch. Comparative Product 4 was also a single layer (layer A) insulated foam board without perforations. Layer A of Comparative Product 4 comprised a general purpose crystal polystyrene with a thickness of 0.217. Comparative Product 5 was a single layer (layer A) insulated foam board system having perforations with layer A comprising a general purpose crystal polystyrene having a thickness of 0.229.

Continuing to refer to Table 1, non-perforated Inventive Product 1 had increased stiffness and strength as measured by ASTM D1037-87 over non-perforated Comparative Products 3 and 4. Specifically, Inventive Product 1 had an MD and a TD flexural strength average stresses at yield, and MD and TD average loads at yield that were higher than Comparative Products 3–5.

higher tensile values than Comparative Product 4, but did not have higher tensile values than Comparative Product 3.

| Physical Characteristics | Inventive Product 1 (Non-Perforated) | Comparative Product 3 (Non-Perforated) | Comparative Product 4 (Non-Perforated) | Inventive Product 2 (Perforated) | Comparative Product 5 (Perforated) |
|---|---|---|---|---|---|
| Structure | A/B/A | A/A | A | A/B/A | A |
| Layer A | GPPS[1] | GPPS | GPPS | GPPS | GPPS |
| Layer A (%) | 83.5 | 100 | 100 | 83.5 | 100 |
| Layer A thickness (in) | 0.228 | 0.233 | 0.217 | 0.243 | 0.229 |
| Layer A basis weight (g/100 sq) | 14.22 | 20.08 | 14.23 | 14.22 | 14.91 |
| Layer A density (lb/cu ft) | 2.46 | 3.28 | 2.5 | 2.46 | 2.48 |
| Layer B | HIPS[2] | — | — | HIPS | — |
| Layer B (%) | 16.5 | — | — | 16.5 | — |
| Layer B thickness (in) | 0.0017 | — | — | 0.0017 | — |
| Layer B basis weight (g/100 sq in) | 2.81 | — | — | 2.81 | — |
| product density (lb/cu ft) | 2.70 | 3.28 | 2.50 | 2.70 | 2.48 |
| product weight (g/100 sq in) | 17.10 | 20.08 | 14.23 | 17.10 | 14.91 |
| product thickness (in) | 0.228 | 0.233 | 0.217 | 0.243 | 0.229 |
| Flexural Properties | | | | | |
| MD flexural strength stress @ yield (psi) | 290 | 230 | 220 | 233 | 130 |
| TD flexural strength stress @ yield (psi) | 224 | 160 | 210 | 182 | 110 |
| MD load @ yield (lb) | 4.4 | 2.9 | 2.5 | 3.2 | 1.6 |
| TD load @ yield (lb) | 4.5 | 2.0 | 2.3 | 2.5 | 1.3 |
| MD displacement @ yield (in) | 0.75 | 0.66 | 0.97 | 0.794 | 0.81 |
| TD displacement @ yield (in) | 0.73 | 0.86 | 1.2 | 0.865 | 1.19 |
| MD strain @ yield (in/in) | 0.0315 | 0.0257 | 0.039 | N/A | 0.0313 |
| TD strain @ yield (in/in) | 0.0336 | 0.0335 | 0.05 | N/A | 0.0451 |
| MD toughness (in-lb/in3) | 1.933 | 0.674 | 1.37 | N/A | 0.5085 |
| TD toughness (in-lb/in3) | 1.43 | 1.235 | 1.811 | N/A | 0.355 |
| Tensile Properties | | | | | |
| MD displacement @ max load (in) | 0.177 | 0.2597 | 0.2017 | 0.188 | N/A |
| TD displacement @ max load (in) | 0.262 | 0.2563 | 0.2208 | 0.2062 | N/A |
| MD max load (lbf) | 64.8 | 81.73 | 51.73 | 53.19 | N/A |
| TD max load (lbf) | 52.97 | 56.23 | 35.45 | 43.46 | N/A |
| MD stress @ max load (psi) | 262.12 | 351.6 | 216.9 | 219.3 | N/A |
| TD stress @ max load (psi) | 221.63 | 241.2 | 157.8 | 182.1 | N/A |
| MD strain @ auto break (%) | 1.797 | 2.623 | 2.043 | 1.906 | N/A |
| TD strain @ auto break (%) | 2.653 | 2.607 | 2.322 | 2.088 | N/A |
| MD modulus (AutYoung) (psi) | 18938 | 21570 | 13470 | 14800 | N/A |
| TD modulus (AutYoung) (psi) | 11318 | 15170 | 8958 | 10480 | N/A |
| MD slope (AutYoung) (lbf/in) | 467.88 | 501.1 | 321 | 358.5 | N/A |
| TD slope (AutYoung) (lbf/in) | 270.5 | 353.3 | 201 | 250.1 | N/A |
| MD energy to break point (lbf-in) | 6.72 | 13.63 | 6.03 | 5.796 | N/A |
| TD energy to break point (lbf-in) | 8.38 | 9.512 | 4.999 | 5.022 | N/A |
| MD toughness (psi) | 2.72 | 5.851 | 2.522 | 2.386 | N/A |
| TD toughness (psi) | 3.51 | 4.065 | 2.232 | 2.105 | N/A |

[1] General purpose crystal polystyrene.
[2] High impact polystyrene (7% butadiene, 93% GPPS).

Perforated Inventive Product 2 also had increased stiffness and strength as measured by ASTM D1037-87 over perforated Comparative Product 5. Specifically, Inventive Product 2 had an MD and TD flexural strength stresses at yield, and MD and TD average loads at yield that was higher than Comparative Product 5. Inventive Product 2 had similar MD flexural strength stress at yield as Comparative Products 3 and 4. Inventive Product 2 had a higher value than Comparative Product 3 and a lower value than Comparative Product 4 in TD flexural strength stress at yield even though Inventive Product 2 was perforated.

Various tensile properties are also shown for Inventive Products 1 and 2, as well as Comparative Products 3 and 4 in Table 1. The tensile properties of Table 1 include MD and TD values for displacement at max load, max load, stress at max load, strain at auto break, modulus, slope, energy to break point and toughness. The tensile properties were measured by ASTM C209-92. Inventive Product 1 had While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. The process of forming an insulated foam board system comprising:

providing a first polymeric web of foam, said first polymeric web of foam comprising a material selected from the group consisting of alkenyl aromatic polymers, polypropylenes, polyethylene terephthalates, polyethylenes and combinations thereof;

providing a second polymeric web of foam, said second polymeric web of foam comprising a material selected from the group consisting of alkenyl aromatic polymers, polypropylenes, polyethylene terephthalates, polyethylenes and combinations thereof;

transporting said first polymeric web of foam through a first set of a plurality of rollers;

transporting said second polymeric web of foam through a second set of a plurality of rollers;

inserting a coated or laminated central layer to provide flexibility between said first polymeric web of foam and said second polymeric web of foam, said central layer comprising a material selected from the group consisting of crystal polystyrene, impact polystyrene, polyethylene terephthalate and combinations thereof, and bonding said central layer to said first polymeric web of foam and said second polymeric web of foam so as to form said insulated foam board system;

wherein the density of the insulated foam board system is from about 1 to about 4 lbs/ft$^3$.

2. The process of claim 1, further comprising:

providing a first driven roller and a second driven roller, said first driven roller and said second driven roller being sufficient spaced so as to allow said central layer, said first polymeric web of foam and said second polymeric web of foam to be transported therebetween; and transporting said central layer, said first polymeric web of foam and said second polymeric layer between said first driven roller and said second driven roller.

3. The process of claim 1, further comprising:

providing perforating creasing equipment; and folding said foam insulation board system with said perforating creasing equipment after bonding said central layer between said first web of foam and said second web of foam.

4. The process of claim 1, further comprising:

providing shearing equipment; and cutting said foam insulation board system with said shearing equipment after bonding said central layer between said first web of foam and said second web of foam to a desired dimension.

5. The process of claim 1, further comprising:

providing a splitter; and splitting a polymeric web of foam to form said first polymeric web of foam and said second polymeric web of foam.

6. The process of claim 1, further comprising cooling at least one side of said first polymeric web of foam.

7. The process of claim 6, further comprising cooling at least one side of said second polymeric web of foam.

8. The process of claim 6, wherein bonding the central layer is accomplished via a coating or a laminating machine.

9. The process of claim 1, further comprising adding an adhesive layer between said central layer and said first polymeric web of foam.

10. The process of claim 1, further comprising adding a laminated surface coating to an outer surface of said first polymeric web of foam.

11. The process of claim 10, further comprising adding a second laminated surface coating to an outer surface of said second polymeric web of foam.

12. The process of claim 10, wherein said laminated surface coating is made from a material selected from the group consisting of impact polystyrene, polypropylene, crystal polystyrene, polyethylenes, metallized polystyrene and combinations thereof.

13. The process of claim 1, wherein said central layer is made from reclaimed material.

14. The process of claim 13, wherein the density of the insulated foam board system is from about 2 to about 4 lbs/ft$^3$.

15. The process of claim 1, wherein the machine direction flexural average strength stress at yield of the insulated foam board system is greater than about 150 psi.

16. The process of claim 15, wherein the machine direction flexural average strength stress at yield of the insulated foam board system is greater than about 250 psi.

17. The process of claim 1, wherein the thickness of the insulated foam board system is from about 1/8 of an inch to about 1 inch.

18. The process of claim 17, wherein the thickness of the insulated foam board system is from about 1/8 to about 1/2 of an inch.

19. The process of claim 1, wherein the insulated foam board system is a flat board sheet.

20. The process of claim 1, wherein the insulated foam board system is a fanfold board.

21. The process of claim 1, wherein said first polymeric web of foam is an alkenyl aromatic polymer, said second polymeric web of foam is an alkenyl aromatic polymer, and said central layer is impact polystyrene.

22. The process of claim 1, wherein said first polymeric web of foam and said second polymeric web of foam are alkenyl aromatic polymers, each of said alkenyl aromatic polymers being a blend of crystal polystyrene and impact polystyrene.

23. The process of claim 9, further comprising adding a second adhesive layer between said second polymeric web of foam and said central layer.

24. The process of forming an insulated foam board system comprising providing a first web of foam comprising polystyrene;

providing a second web of foam comprising an independently selected polystyrene;

transporting said first polymeric web of foam through a first set of a plurality of rollers;

transporting said second polymeric web of foam through a second set of a plurality of rollers;

inserting a coated or laminated central layer to provide flexibility between said first polymeric web of foam and said second polymeric web of foam, said central layer comprising a high impact polystyrene, bonding said central layer to said first polymeric web of foam and said second polymeric web of foam so as to form said insulated foam board system;

wherein the density of the insulated foam board system is from about 1 to about 4 lbs/ft$^3$.

25. The process of claim 24, further comprising:

providing a first driven roller and a second driven roller, said first driven roller and said second driven roller being sufficient spaced so as to allow said central layer, said first polymeric web of foam and said second polymeric web of foam to be transported therebetween; and transporting said central layer, said first polymeric web of foam and said second polymeric layer between said first driven roller and said second driven roller.

26. The process of claim 24, further comprising:

providing perforating creasing equipment; and folding said foam insulation board system with said perforating creasing equipment after bonding said central layer between said first web of foam and said second web of foam.

27. The process of claim 24, further comprising:

providing shearing equipment; and cutting said foam insulation board system with said shearing equipment after bonding said central layer between said first web of foam and said second web of foam to a desired dimension.

28. The process of claim 24, further comprising:

providing a splitter; and splitting a polymeric web of foam to form said first polymeric web of foam and said second polymeric web of foam.

29. The process of claim 24, further comprising cooling at least one side of said first polymeric web of foam.

30. The process of claim 29, further comprising cooling at least one side of said second polymeric web of foam.

31. The process of claim 29, wherein bonding the central layer is accomplished via a coating or a laminating machine.

32. The process of claim 24, further comprising adding an adhesive layer between said central layer and said first polymeric web of foam.

33. The process of claim 32, further comprising adding a second adhesive layer between said second polymeric web of foam and said central layer.

34. The process of claim 24, further comprising adding a laminated surface coating to an outer surface of said first polymeric web of foam.

35. The process of claim 34, further comprising adding a second laminated surface coating to an outer surface of said second polymeric web of foam.

36. The process of claim 34, wherein said laminated surface coating is made from a material selected from the group consisting of impact polystyrene, polypropylene, crystal polystyrene, polyethylenes, metallized polystyrene and combinations thereof.

37. The process of claim 24, wherein said central layer is made from reclaimed material.

38. The process of claim 24, wherein the density of the insulated foam board system is from about 2 to about 4 lbs/ft$^3$.

39. The process of claim 24, wherein the thickness of the insulated foam board system is from about ⅛ of an inch to about 1 inch.

40. The process of claim 39, wherein the thickness of the insulated foam board system is from about ⅛ to about ½ of an inch.

41. The process of claim 24, wherein the insulated foam board system is a flat board sheet.

42. The process of claim 24, wherein the insulated foam board system is a fanfold board.

\* \* \* \* \*